(12) United States Patent
Phillips

(10) Patent No.: US 11,891,156 B2
(45) Date of Patent: Feb. 6, 2024

(54) PERSONAL WATERCRAFT GUNWALE ROD HOLDER

(71) Applicant: Johnny Robert Phillips, Auburndale, FL (US)

(72) Inventor: Johnny Robert Phillips, Auburndale, FL (US)

( * ) Notice: Subject to any disclaimer, the term of this patent is extended or adjusted under 35 U.S.C. 154(b) by 195 days.

(21) Appl. No.: 17/676,677

(22) Filed: Feb. 21, 2022

(65) Prior Publication Data

US 2022/0266958 A1 Aug. 25, 2022

Related U.S. Application Data

(60) Provisional application No. 63/200,261, filed on Feb. 24, 2021.

(51) Int. Cl.
*B63B 34/00* (2020.01)
*B63B 17/00* (2006.01)
*A01K 97/10* (2006.01)

(52) U.S. Cl.
CPC .............. *B63B 34/05* (2020.02); *A01K 97/10* (2013.01); *B63B 17/00* (2013.01)

(58) Field of Classification Search
CPC .......... A01K 97/10; B63B 34/10; B63B 17/00
See application file for complete search history.

(56) References Cited

U.S. PATENT DOCUMENTS

| | | | | |
|---|---|---|---|---|
| 2,314,747 A | * | 3/1943 | White .................... | A01K 97/10 224/922 |
| 2,522,255 A | * | 9/1950 | Climo .................... | A01K 97/10 248/228.6 |
| 2,887,287 A | * | 5/1959 | Ross ...................... | A01K 97/10 248/229.15 |
| 2,893,667 A | * | 7/1959 | Shumaker .............. | A01K 97/10 126/30 |
| 2,908,460 A | * | 10/1959 | Townsend .............. | A01K 97/10 248/515 |
| 3,015,467 A | * | 1/1962 | Vieaux ................... | A01K 97/10 43/21.2 |
| 3,385,544 A | * | 5/1968 | Barnett .................. | A01K 97/10 248/513 |
| 3,599,026 A | * | 8/1971 | Tsuneta .................. | H01J 29/24 313/30 |
| 4,697,775 A | * | 10/1987 | Wille ..................... | B63B 45/06 248/214 |

(Continued)

FOREIGN PATENT DOCUMENTS

ES 2794674 A2 * 11/2020

*Primary Examiner* — Christopher R Harmon

(57) ABSTRACT

The invention is defined as a personal watercraft gunwale rod holder complete design, fastened to a personal watercraft gunwale port or starboard. It functions as a support for rod and reels or accessories and incorporates a structure that allows unobstructed access to rod and reels of the personal watercraft port or starboard.

An incorporated locking mechanism functions as a positioning lock that also allows quick release by the user of the personal watercraft.

This invention allows to lade different accessories such as rod and reels, gaff, net, flag, or other accessories.

This invention is designed for all personal watercraft users, including those with mobility restrictions that have restricted access to the personal watercraft when obstructed by placement of items.

11 Claims, 3 Drawing Sheets

(56) References Cited

U.S. PATENT DOCUMENTS

| | | | |
|---|---|---|---|
| 2005/0035249 A1* | 2/2005 | Busuito | A01K 97/10 248/231.51 |
| 2005/0229470 A1* | 10/2005 | King | A01K 97/10 43/21.2 |
| 2006/0043661 A1* | 3/2006 | Nardozza | B25B 5/102 269/166 |
| 2018/0020651 A1* | 1/2018 | Larkin | B60R 7/08 43/21.2 |

* cited by examiner

PERSONAL WATERCRAFT GUNWALE ROD HOLDER

CROSS-REFERENCE TO RELATED APPLICATIONS

Provisional Application 63/200,261 Personal Watercraft No Drill Gunwale Rod Holders, Feb. 24, 2021, Mr. Johnny Robert Phillips This application claims the benefit of U.S. Provisional Application No. 63/200,261, filed Feb. 24, 2021, by the same inventor (Phillips), the entirety of which provisional application is hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING OR INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

This invention should be classified as personal watercraft accessory for lading cargo as defined in U.S. patent definitions:
  (a) B63B17/00—Vessels parts, details, or accessories, not otherwise provided for
  (b) B63B25/00—Load-accommodating arrangements, e.g., stowing, trimming; Vessels characterized thereby
  Description of Related Art including information disclosed under 37 CFR 1.97 and 1.98. The current designs do not provide a solution for the unrestricted user ability of access or attend to rod and reel equipment on a personal watercraft. Current designs are fixed rod and reel structures installed drill mounted on personal watercraft impede accessibility and removal. Current designs use diverse types of rod holder accessories are drill mounted on personal watercraft. Additionally, other structures are used that may secure seats on a personal watercraft.
  The following referenced patents describe fixed structures for lade as described above.
  (c) Background Art U.S. Pat. No. 7,278,233 B2 Dual Fishing Rod Holder, Oct. 9, 2007, Robert T. Melville
  (d) Background Art U.S. Pat. No. 11,172,666 B2 Fishing Rod Holder, Nov. 16, 2021, Ju-Yi Tsai
  (e) Background Art U.S. Pat. No. 9,615,564 B2 Rod Holder, Apr. 11, 2017, Michael john William Liney A broad availability of manufacturers found on the market include different fixed rod and reel structures that could be fastened, drill mounted on personal watercraft, but there is no current design in the market with the same functionalities and solutions for accessibility or removal that are attributes of this invention.

In the background of analyzed designs, it is observed a lack of accessibility or removal due to the equipping of drill fix mounting, that affects the hull integrity, and that impedes access due to positioning. These fixed structures designs while producing a hull integrity loss, do not include a feature to allow the immediate access on personal watercraft deeming them less safe than the current invention.

Additionally, their fastening features to the personal watercraft is completely different because of the fastening features proposed in this invention that proposes a novel removal feature.

Additionally, this invention feature's ability to attach additional accessories. Accessories such as fishing rod holders, gaffs, nets, and flags.

This innovative invention solves an ergonomic impediment allowing the accessibility to the selected items during fishing operations utilizing it positioning ensures a user can sustain maritime law not leaving control position during fishing operations, making it safer.

Their fastening features to the personal watercraft is completely different because they bolt into position lessening the hull integrity. Instead of the fastening features proposed in this invention that proposes a novel gunwale clamp, removable mechanism, with no hull integrity loss.

This invention enables access to the fishing gear and accessories, provided by positioning on port or starboard gunwale of the user when seated. This invention, therefore, provides a lade of supplies whilst allowing immediate access to them when required by the user. A locking mechanism is included in the design to feature a removable mechanism as desired of the user. This innovative invention solves an ergonomic impediment allowing the accessibility to the selected accessories at will.

BRIEF SUMMARY OF THE INVENTION

This invention consists of a removable mechanism that is easy to fasten on the port or starboard gunwale of the personal watercraft. It allows to lade with ease accessories such as fishing equipment, gaff, net, and accessories.

The invention is split into two main assemblies: a fixed structure, and a locking mechanism that allows positioning structure without hull integrity loss mounting. The fixed structure fastened to the port or starboard gunwale of a personal watercraft provides rigidity and stability to the positioned system.

The fixed structure may be fastened to the port or starboard gunwale by use of an adjustable clamp, and a baseplate resting on the port or starboard gunwale in a preferred design. An adjustable clamp is secured to a point on the outside top of rod holder mechanism of the rider seat. A threaded knob tightly holds the invention to port or starboard gunwale. A resting baseplate is placed on the port or starboard gunwale. The lock mechanism allows the full fixation of the fixed structure to the personal watercraft port or starboard gunwale allowing to function without instability.

Once installed to the port or starboard gunwale personal watercraft, the fastened mechanism consists of metallic parts with nylon pads assembled preventing corrosion and scratching to the port or starboard gunwale or hull without hull integrity loss mounting.

The locking mechanism is designed to allow the user the removal of the mechanism from the personal watercraft at will.

Except for the nylon pads, to avoid corrosion all metallic parts are made of either aluminum or stainless steel and powder coated. The nylon pads are designed to eliminate scratching of hull surface and eliminate hull integrity loss from drilling.

All parts of this invention are welded except for nylon pads and bolted on accessories. To avoid corrosion all metallic parts are made of either aluminum or stainless steel and powder coated. This invention allows the assembly of different cargo accessories such as fishing rod holders, gaffs, nets, and flags.

BRIEF DESCRIPTION OF THE SEVERAL VIEWS OF THE DRAWING(S)

DETAILED DESCRIPTION OF THE INVENTION

Figure 1:
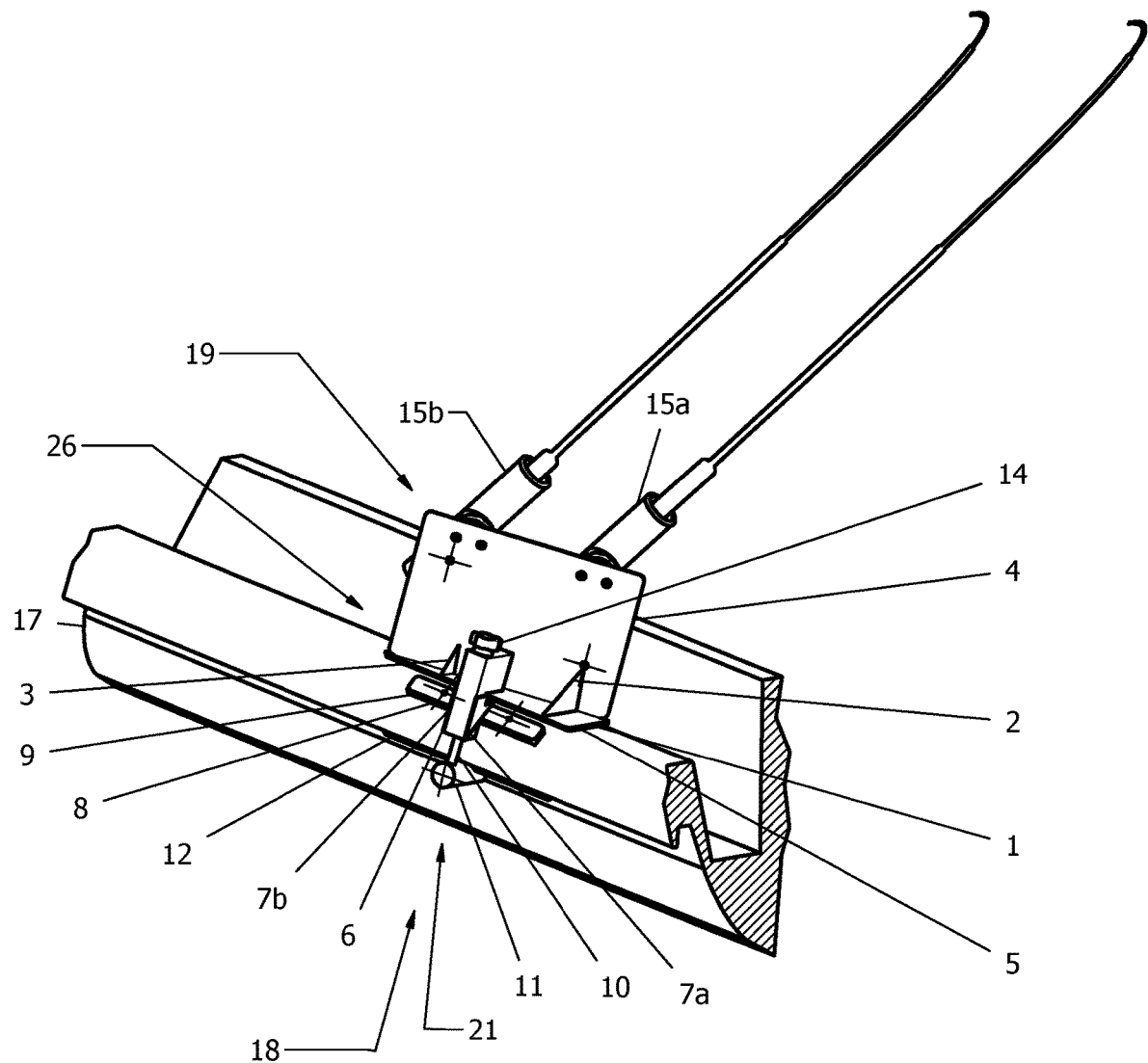
FIG. 1 is a perspective view of a gunwale clamp with support, support tabs, and fishing rod holders, constructed according to the present invention, and fitted to a personal watercraft gunwale section.

As shown in FIG. 1, the present invention consists of four assemblies, a gunwale clamp 18, a support 19, and two fishing rod holders 15a and 15b.

Figure 3:
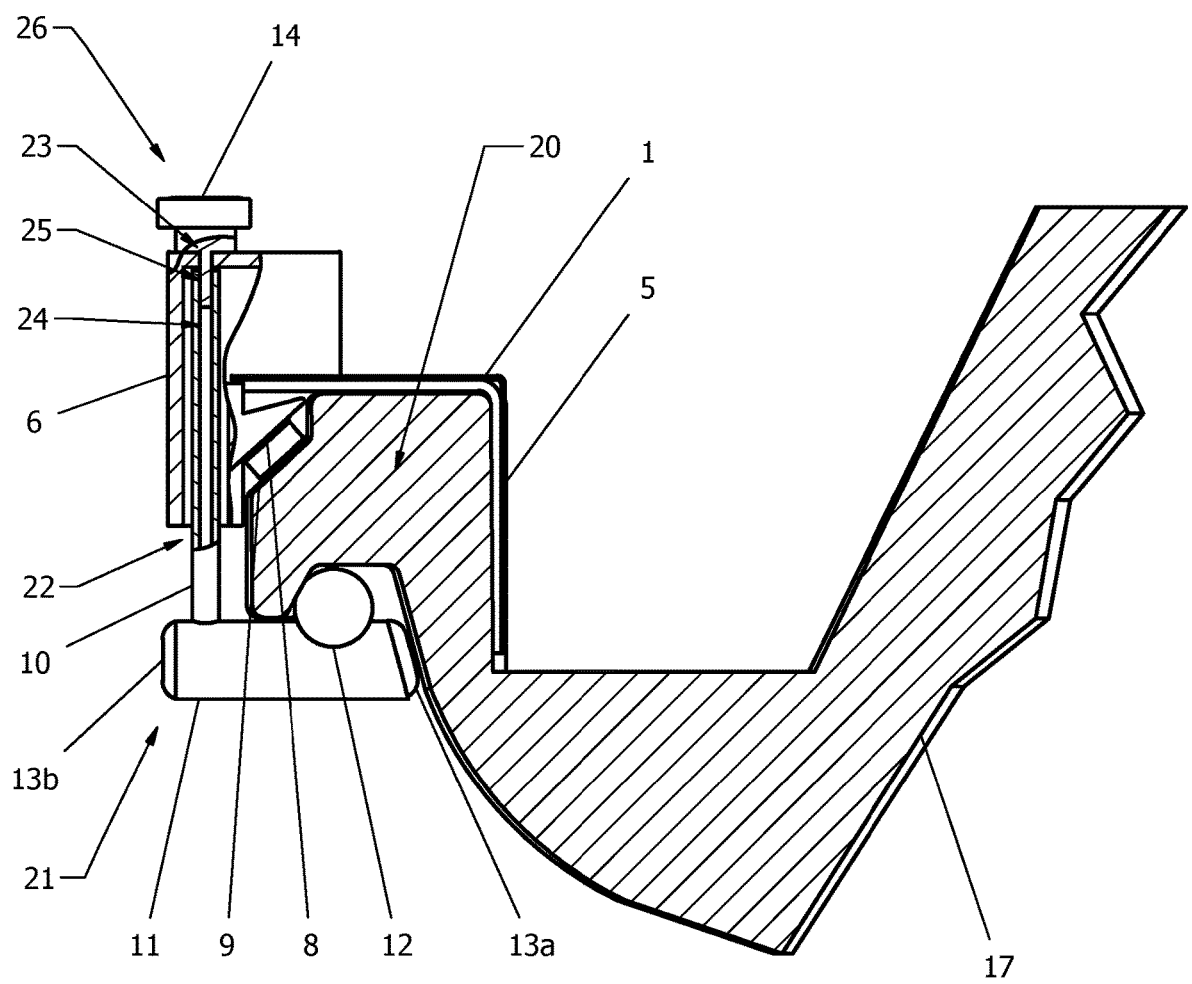
FIG. 3 is a rear section view from the stern of a gunwale clamp constructed according to the present invention and fitted to a personal watercraft gunwale section.

As shown in FIG. 1, and FIG. 3, the gunwale clamp 18 adapts and locks to the gunwale 17 by use of three components an adjustable clamp 26, a clamp tab 8 and an angled plate 1. Both the clamp tab 8 and an angled plate 1 are assembled to the clamp square tube with miter joint 6 of the adjustable clamp 26.

As shown in FIG. 3, the angled plate 1 rests on the top of the gunwale rub rail 20 and bends contouring the interior of the gunwale 17. The angled plate 1 includes a nylon protection 5 to avoid damage on the gunwale 17 surface.

As shown in FIG. 3, the clamp tab 8 rests on the exterior of the gunwale rub rail 20 and includes a nylon protection 9 to avoid damage on the gunwale 17 surface.

As shown in FIG. 1, the clamp tab 8 is welded to support tabs 7a and 7b that are welded to the clamp square tube with miter joint 6.

As shown in FIG. 3, the adjustable clamp 26 is an assembly of a clamp square tube with miter joint 6, a clamp arm 21 inserted from the bottom, and a knob 14 with threads 25 inserted from the top. The adjustable clamp 26 function is performed by the threaded link of the thread 25 of the knob and the threaded hole 24 of the vertical threaded bar 10.

As shown in FIG. 3, the clamp arm 21 locks from beneath the rub rail 20.

As shown in FIG. 1, and FIG. 3, the clamp arm 21 is an assembly of a clamp bar 12, a horizontal tube 11, and a vertical threaded bar 10.

As shown in FIG. 3, the clamp bar 12 is welded to the horizontal tube 11, that is also welded to a vertical threaded bar 10. The horizontal tube 11 implements nylon protections 13a and 13b.

As shown in FIG. 3, the clamp arm 21 height is adjusted by means of its vertical threaded bar 10 which is introduced into the bottom 22 of the clamp square tube with miter joint 6.

As shown in FIG. 3, the clamp square tube with miter joint 6 is welded to the angled plate 1.

As shown in FIG. 3, the knob thread 25 is introduced from the top drilled hole 23 of the cap of the clamp square tube with miter joint 6.

As shown in FIG. 3, the knob threads 25 and threaded hole 24 on vertical threaded bar 10 provide a threaded union. The vertical threaded bar 10 is adjusted and tightened to the clamp square tube with miter joint 6 by means of the knob 14 and allows the adjustment of the adjustable clamp 26.

As shown in FIG. 1, a support is assembled by tree parts, the upper plate 4 and tabs 2 and 3. These parts are welded to the angled plate 1.

Figure 2:
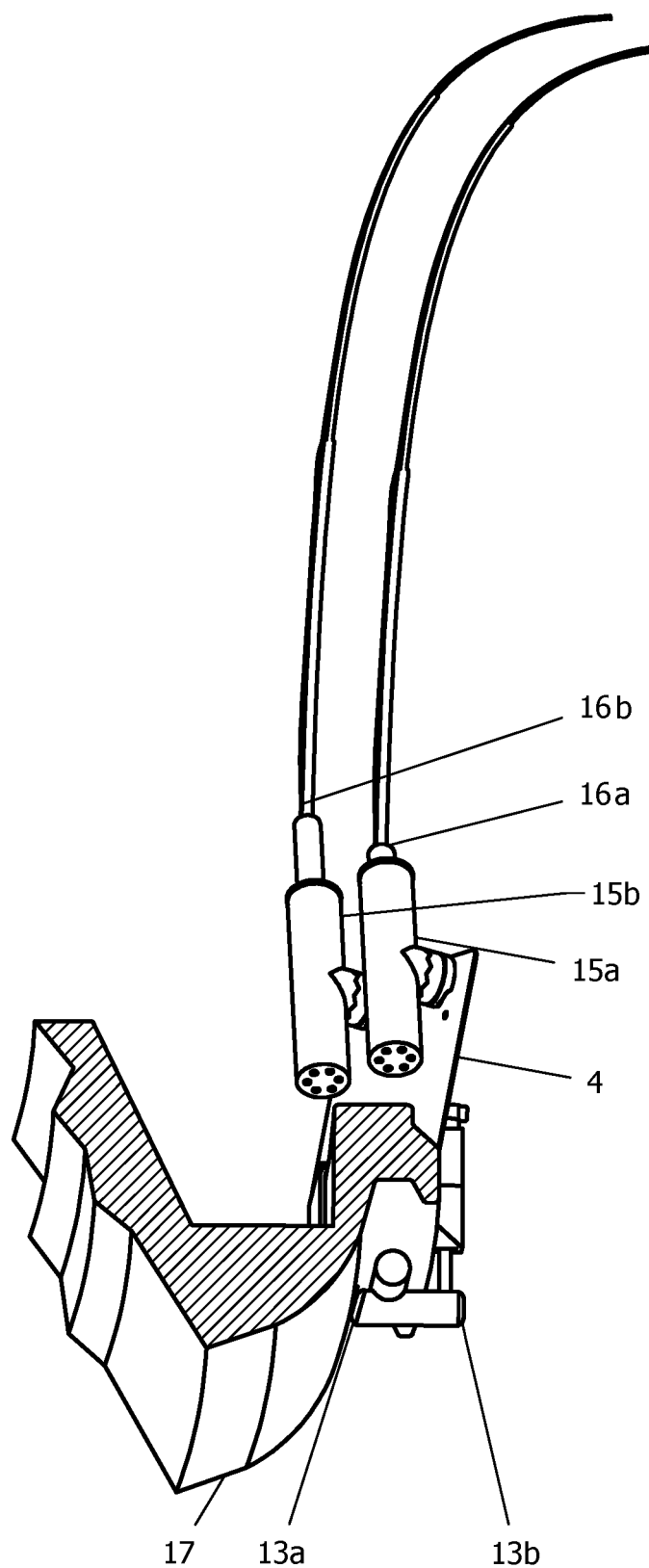
FIG. 2 is a perspective view from the bow of a gunwale clamp with support, support tabs, and fishing rod holders, constructed according to the present invention, and fitted to a personal watercraft gunwale section.

As shown in FIG. 2, the two rotatable rod holders 15a and 15b are bolted onto the upper plate 4. The rod holders can hold fishing rods 16a and 16b.

The invention claimed is:

1. A personal watercraft gunwale rod holder comprising: an adjustable clamp comprising a clamp arm formed from a horizontal tube welded to a clamp bar and a vertical threaded bar; said vertical threaded bar of said clamp arm inserted from the bottom of a clamp square tube with a miter joint in a position to receive a threaded post of an adjustment knob through a top of said clamp square tube for securing a clamping force from below a gunwale rub rail; and an angled plate assembled with said clamp square tube that rests on the top of the gunwale rub rail and bends contouring the interior of the gunwale.

2. The personal watercraft gunwale rod holder of claim 1, further comprising a support welded to said angled plate.

3. The personal watercraft gunwale rod holder of claim 2, wherein said support comprises support tabs welded to said angled plate.

4. The personal watercraft gunwale rod holder of claim 2, wherein said support further comprises fishing rod holders.

5. The personal watercraft gunwale rod holder of claim 2, is configured to support a gaff.

6. The personal watercraft gunwale rod holder of claim 2, is configured to support a net.

7. The personal watercraft gunwale rod holder of claim 2, is configured to support a flag.

8. The personal watercraft gunwale rod holder of claim 1, wherein said angled plate further comprises nylon protections to avoid damaging the gunwale.

9. The personal watercraft gunwale rod holder of claim 1, wherein said horizontal tube further comprises nylon protections to avoid damaging the gunwale or contact from the exterior of the personal watercraft.

10. The personal watercraft gunwale rod holder of claim 1, further comprising a clamp tab which rests on the exterior of the gunwale rub rail and comprises nylon protections to avoid damaging the gunwale.

11. The personal watercraft gunwale rod holder of claim 1, comprising a powder coating for added strength and to avoid corrosion.

* * * * *